United States Patent
Franczek et al.

(10) Patent No.: US 8,407,796 B2
(45) Date of Patent: *Mar. 26, 2013

(54) COMPUTER VIRUS SCREENING METHODS AND SYSTEMS

(75) Inventors: Edward J. Franczek, Glencoe, IL (US); John Thomas Bretscher, Elgin, IL (US); Raymond Walden Bennett, III, Naperville, IL (US)

(73) Assignee: AUCTNYC 8 LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/845,479

(22) Filed: Jul. 28, 2010

(65) Prior Publication Data

US 2010/0313272 A1    Dec. 9, 2010

Related U.S. Application Data

(63) Continuation of application No. 10/810,443, filed on Mar. 26, 2004, now Pat. No. 7,774,840, which is a continuation of application No. 10/196,892, filed on Jul. 16, 2002, now abandoned, which is a continuation (Continued)

(51) Int. Cl.
  *G06F 21/00* (2006.01)
(52) U.S. Cl. .......................................................... 726/24
(58) Field of Classification Search .............. 726/22.23, 726/24
See application file for complete search history.

(56) References Cited

U.S. PATENT DOCUMENTS

| | | | |
|---|---|---|---|
| 4,975,950 A | 12/1990 | Lentz | |
| 5,319,776 A | 6/1994 | Hile et al. | |
| 5,359,659 A | 10/1994 | Rosenthal | |
| 5,440,723 A | 8/1995 | Arnold et al. | |
| 5,485,575 A | 1/1996 | Chess et al. | |
| 5,509,120 A | 4/1996 | Merkin et al. | |
| 5,511,163 A | 4/1996 | Lerche et al. | |
| 5,511,184 A | 4/1996 | Lin | |
| 5,623,600 A | 4/1997 | Ji et al. | |
| 5,684,875 A | 11/1997 | Ellenberger | |
| 5,696,822 A | 12/1997 | Nachenberg | |
| 5,832,208 A | 11/1998 | Chen et al. | |
| 5,842,002 A | 11/1998 | Schnurer et al. | |
| 5,848,137 A | 12/1998 | Hsiao | |
| 5,889,943 A | 3/1999 | Ji et al. | |
| 5,918,008 A | 6/1999 | Togawa et al. | |
| 5,960,170 A | 9/1999 | Chen et al. | |
| 5,987,610 A | 11/1999 | Franczek et al. | |
| 5,999,526 A | 12/1999 | Garland et al. | |
| 6,016,546 A | 1/2000 | Kephart et al. | |
| 6,047,273 A | 4/2000 | Vaghi | |
| 6,088,803 A | 7/2000 | Tso et al. | |

(Continued)

OTHER PUBLICATIONS

Ian Leitch, "Computer Viruses: A Problem of Management," Engineering Management Journal, Feb. 1994, pp. 21-24.

(Continued)

*Primary Examiner* — Gilberto Barron, Jr.
*Assistant Examiner* — Devin Almeida
(74) *Attorney, Agent, or Firm* — Sterne, Kessler, Goldstein & Fox PLLC

(57) ABSTRACT

A method includes receiving a status update from a client device, the status update reflects at least one change associated with the client device, updating a model of the client device based on the status update, receiving data to be screened for a virus, the data is received after an updating of the model of the client device, and screening the model of the client device for the virus. Systems and articles of manufacture are also disclosed.

18 Claims, 11 Drawing Sheets

Related U.S. Application Data of application No. 10/153,466, filed on May 21, 2002, now abandoned, which is a continuation of application No. 09/383,885, filed on Aug. 26, 1999, now Pat. No. 6,397,335, which is a continuation of application No. 09/022,512, filed on Feb. 12, 1998, now Pat. No. 5,987,610.

(56) References Cited

U.S. PATENT DOCUMENTS

| | | | |
|---|---|---|---|
| 6,119,165 | A | 9/2000 | Li et al. |
| 6,119,233 | A | 9/2000 | Hawkins |
| 6,240,530 | B1 | 5/2001 | Togawa |
| 6,338,141 | B1 | 1/2002 | Wells |
| 6,393,568 | B1 | 5/2002 | Ranger et al. |
| 6,397,335 | B1 | 5/2002 | Franczek et al. |
| 7,363,655 | B2 | 4/2008 | Franczek et al. |
| 7,774,840 | B2 | 8/2010 | Franczek et al. |
| 2002/0138766 | A1 | 9/2002 | Franczek et al. |
| 2002/0174350 | A1 | 11/2002 | Franczek et al. |
| 2004/0230827 | A1 | 11/2004 | Franczek et al. |
| 2005/0132216 | A1 | 6/2005 | Franczek et al. |

OTHER PUBLICATIONS

Gerald Tesauro, "Neural Networks for Computer Virus Recognition," IEEE, Aug. 1996, pp. 5-6.
Robert Niemeyer, "Using Web Technologies in Two MLS Environment: A Security Analysis," IEEE, 1997, pp. 205-214.
"A Generic Virus Scanner in C++," ftp.cerias.purdue.edu/pub/papers/sandeep-kumar/kumar-spaf-scanner.pdf, Sep. 17, 1992, 21 pgs.
"DoD Products—Trusted Gateway System," http://www.tcs-sec.com/products/trusted-gateway-system/trusted-gateway-system.html, 2001, 4 pgs.
"Intrusion Detection Systems," Panagiotis Astithas, http://www.daemonnews.org/199905/ids.html, 1999, 6 pgs.
"Annual Technical Report for Ada Embedded Systems Testbed Project," Weiderman et al., Dec. 1987, 58 pgs.
"Multics Features," http://www.multicians.org/features.html, Jan. 12, 2003, 16 pgs.
"Malicious Data and Computer Security," W. Olin Sibert, InterTrust Technologies Corporation, home.earthiink.net/~wolfboy/ARCHIVE/GenSecure/maldata.htm, printed Feb. 19, 2003, 10 pgs.
"2.4 The TUNIX Firewall: Extensions and Third-Party Components," www.tunix.nl/fire/wp-eng/chapter2.4.html, copyright 1997-99, 2000, printed Feb. 19, 2003, 9 pgs.
"SBC Donates $7.3M Patent to UT," Austin Business Journal, http://austin.bizjournal.com/austin/stories/2003/02/03/daily6.html, Feb. 3, 2003, 1 pg.
Third Party Email, Feb. 18, 2003, 6 pgs.
Third Party Email, Mar. 2, 2003, 9 pgs.
Third Party Email, Mar. 14, 2003, 5 pgs.
Third Party Email, Mar. 18, 2003, 3 pgs.
Third Party Email, Mar. 20, 2003, 13 pgs.
Third Party Email, May 12, 2003, 13 pgs.
IPO Daily News, May 22, 2003, 1 pg.
"Patent Donations are Criticized," New York Times, Mar. 17, 2003, 2 pgs.
Complaint for Patent Infringement, filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc. (USA)*, Civil Action No. 1:10-cv-01067, United States District Court for the District of Delaware, filed Dec. 8, 2010; 14 pages.
Affidavit of Brian E. Farnan in Support of Request for Clerk to Serve Check Point Software Technologies Ltd., filed in *Intellectual Ventures I LLC, v. Check Point Software Technologies Ltd.*, et al., Civil Action No. 1:10-cv-01067, United States District Court for the District of Delaware, filed Jan. 6, 2011; 1 page.
McAfee Inc.'s Answer to Intellectual Ventures I LLC's Complaint, filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc. (USA)*, Civil Action No, 1:10-cv-01067, United States District Court for the District of Delaware, filed Jan. 31, 2011; 13 pages.
Defendant's Notice of Party with Financial Interest, filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc. (USA)*, Civil Action No. 1:10-cv-01067, United States District Court for the District of Delaware, filed Jan. 31, 2011, 4 pages.
Defendant Symantec's Corporation's Answer, Affirmative Defenses, and Counterclaims, filed in *Intellectual Ventures I LLC, v. Check Point Software Technologies Ltd., Check Point Software Technologies, Inc., McAfee, Inc., Symantec Corp., Trend Micro incorporated*, and *Trend Micro, Inc. (USA)*, Civil Action No. 1:10-cv-01067, United States Court for the District of Delaware, filed Jan. 31, 2011; 16 pages.
Defendant Check Point Software Technologies Inc.'s Answer and Counterclaims, filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc. (USA)*, Civil Action No. 1:10-cv-01067, United States District Court for the District of Delaware, filed Jan. 31, 2011; 15 pages.
Check Point Software Technologies Inc.'s Fed. R. Civ. P. 7.1 Statement, filed in *Intellectual Ventures I LLC, v. Check Point Software Technologies Ltd., Check Point Software Technologies, Inc., McAfee., Symantec Corp., Trend Micro Incorporated*, and *Trend Micro, Inc. (USA)*, Civil Action No. 1:10-cv-01067, United States District Court for the District of Delaware, filed Jan. 31, 2011; 4 pages.
Defendant Symantec Corporation's Corporate Disclosure Statement, filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc. (USA)*, Civil Action No. 1:10-cv-01067, United States District Court for the District of Delaware, filed Jan. 31, 2011; 4 pages.
Defendants Trend Micro Incorporated and Trend Micro Incorporated (USA)'s Answer to Complaint and Counterclaims, filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc. (USA)*, Civil Action No. 1:10-cv-01067, United States District Court for the District of Delaware, filed Feb. 14, 2011; 21 pages.
Corporate Disclosure Statement of Defendants Trend Micro Incorporated (USA) and Trend Micro Incorporated (Japan), filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc. (USA)*, Civil Action No. 1:10-cv-01067, United States District Court for the District of Delaware, filed Feb. 18, 2011; 5 pages.
Defendant Check Point Software Technologies Ltd.'s Answer, filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc. (USA)*, Civil Action No. 1:10-cv-01067, United States District Court for the District of Delaware, filed Feb. 23, 2011; 12 pages.
Check Point Software Technologies Ltd.'s Fed. R. Civ. P. 7.1 Statement, filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc. (USA)*, Civil Action No. 1:10-cv-01067, United States District Court for the District of Delaware, filed Feb. 23, 2011; 4 pages.
Intellectual Ventures I LLC's Answer to Symantec Corporation's Counterclaims, filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc. (USA)*, Civil Action No. 1:10-cv-01067, United States District Court for the District of Delaware, filed Feb. 24, 2011; 4 pages.
Intellectual Ventures I LLC's Answer to Check Point Software Technologies Inc.'s Counterclaims, filed in *Intellectual Ventures I LLC, v. Check Point Software Technologies Ltd., Check Point Software Technologies, Inc., McAfee, Inc., Symantec Corp., Trend Micro Incorpo-*

*rated*, and *Trend Micro, Inc.* (USA), Civil Action No. 1:10-cv-01067, United States District Court for the District of Delaware, filed Feb. 24, 2011; 4 pages Intellectual Ventures I LLC's Answer to Trend Micro Incorporated and Trend Micro, Inc. (USA)'s Counterclaims, filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc.* (USA), Civil Action No. 1:10-cv-01067, United States District Court for the District of Delaware, filed Mar. 10, 2011; 7 pages.

Proposed Scheduling Order, filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc.* (USA), Civil Action No. 1:10-cv-01067, United States District Court for the District of Delaware, filed Aug. 8, 2011; 9 pages.

Intellectual Ventures I LLC's Opposition to Defendants' Motion for Reconsideration of Jun. 22, 2011 Order Denying Motion for Transfer, filed in *Intellectual Ventures I LLC, v. Check Point Software Technologies Ltd.*, et al., Civil Action No. 1:10-cv-01067, United States District Court for the District of Delaware, filed May 7, 2012; 8 pages.

McAfee, Inc.'s Opening Brief in Support of Its Motion for Leave to Amend Answer and Counterclaims, filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc.* (USA), Civil Action No. 1:10-cv-01067, United States District Court for the District of Delaware, filed May 25, 2012; 6 pages.

Parties' Joint Claim Construction Chart with accompanying Exhibits A-O, filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc.* (USA), Civil Action No. 1:10-cv-01067, United States District Court for the District of Delaware, filed May 25, 2012; 425 pages.

Plaintiff's Opening Claim Construction Brief, filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc.* (USA), Civil Action No. 1:10-cv-01067, United States District Court for the District of Delaware, filed Jun. 5, 2012; 97 pages.

Defendants' Opening Claim Construction Brief, filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc.* (USA), Civil Action No. 1:10-cv-01067, United States District Court for the District of Delaware, filed Jun. 5, 2012; 53 pages.

Declaration of Vernon M. Winters in Support of Defendants' Opening Claim Construction Breif, filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc.* (USA), Civil Action No. 1:10-cv-01067, United States District Court for the District of Delaware, filed Jun. 5, 2012; 29 pages.

McAfee, Inc.'s Amended Answer and Counterclaims to Intellectual Ventures I LLC's Complaint, filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc.* (USA), Civil Action No. 1:10-cv-01067, United States District Court for the District of Delaware, filed Jun. 15, 2012; 17 pages.

Defendants' Responsive Claim Construction Brief, filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc.* (USA), Civil Action No. 1:10-cv-01067, United States District Court for the District of Delaware, filed Jun. 26, 2012; 32 pages.

Supplemental Declaration of Vernon M. Winters in Support of Defendants' Responsive Claim Construction Brief, filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc.* (USA), Civil Action No. 1:10-cv-01067, United States District Court for the District of Delaware, filed Jun. 26, 2012; 21 pages.

Plaintiff's Responsive Claim Construction Brief, filed in *Intellectual Ventures I LLC, v. Check Point Software Technologies Ltd.*, et al., Civil Action No. 1:10-cv-01067, United States District Court for the District of Delaware, filed Jun. 26, 2012; 31 pages.

Declaration of Dr. Patrick D. McDaniel in Support of Plaintiff's Responsive Claim Construction Brief, filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc.* (USA), Civil Action No. 1:10-cv-01067, United States District Court for the District of Delaware, filed Jun. 26, 2012; 35 pages.

Plaintiff Intellectual Ventures I LLC's Comment on Defendants' Technology Tutorial, filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc.* (USA), Civil Action No. 1:10-cv-01067, United States District Court for the District of Delaware, filed Jun. 26, 2012; 6 pages.

Joint Letter to the Honorable Leonard P. Stark from Brian E. Farnan regarding Claim Construction Hearing, filed in *Intellectual Ventures I LLC, v. Check Point Software Technologies Ltd.*, et al., Civil Action No. 1:10-cv-01067, United States District Court for the District of Delaware, filed Jun. 26, 2012; 1 page.

Court Docket History for Civil Action No. 1:10-cv-01067, *Intellectual Ventures I LLC, v. Check Point Software Technologies Ltd.*, et al., filed Dec. 8, 2010, last downloaded Sep. 6, 2012; 42 pages.

Memorandum Opinion, filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc.* (USA), Civil Action No. 1:10-cv-01067, United States District Court for the District of Delaware, filed Dec. 12, 2012; 32 pages.

Order, filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc.* (USA), Civil Action No. 1:10-cv-01067, United States District Court for the District of Delaware, filed Dec. 12, 2012; 4 pages.

Motion of Clarification, filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc.* (USA), Civil Action No. 1:10-cv-01067, United States District Court for the District of Delaware, filed Dec. 26, 2012; 6 pages.

Defendants' Opening Brief in Support of Their Motion for Clarifictions of the Court's Construction of "Within the Telephone Network", filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc.* (USA), Civil Action No. 1:10-cv-01067, United States District Court for the District of Delaware, filed Dec. 26, 2012; 17 pages.

Declaration of Stuart Bartow in Support of Motion for Clarification of the Court's Construction of "Within the Telephone Network", filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc.* (USA), Civil Action No. 1:10-cv-01067, United States District Court for the District of Delaware, filed Dec. 26, 2012; 3 pages.

Letter to the Honorable Leonard P. Stark from Jack B. Blumenfeld regarding Jan. 3, 2013 Discovery Conference (Redacted), with accompanying Exhibits A-C, filed in *Intellectual Ventures I LLC, v. Check Point Software Technologies Ltd., Check Point Software Technologies, Inc., McAfee, Inc., Symantec Corp., Trend Micro Incorporated*, and *Trend Micro, Inc.* (USA), Civil Action No. 1:10-cv-01067, United States District Court for the District of Delaware, filed Dec. 27, 2012; 62 pages.

Letter to the Honorable Leonard P. Stark from Karen Jacobs Louden regarding issues for Jan. 3, 2013 Discovery Conference (Redacted), with accompanying Exhibits A-T, filed in *Intellectual Ventures I LLC, v. Check Point Software Technologies Ltd., Check Point Software Technologies, Inc., McAfee, Inc., Symantec Corp., Trend Micro*

*Incorporated*, and *Trend Micro, Inc.* (USA), Civil Action No. 1:10-cv-01067, United States District Court for the District of Delaware, filed Dec. 27, 2012; 78 pages.

Plaintiff's Response in Opposition to Defendants' Motion for Clarification, filed in *Intellectual Ventures I LLC*, v. *Check Point Software Technologies Ltd., Check Point Software Technologies, Inc., McAfee, Inc., Symantec Corp., Trend Micro Incorporated*, and *Trend Micro, Inc.* (USA), Civil Action No. 1:10-cv-01067, United States District Court for the District of Delaware, filed Jan. 14, 2012; 14 pages.

Declaration of John P. Lahad in Support of Plaintiff's Response in Opposition to Defendants' Motion for Clarification, filed in *Intellectual Ventures I LLC*, v. *Check Point Software Technologies Ltd., Check Point Software Technologies, Inc., McAfee, Inc., Symantec Corp., Trend Micro Incorporated*, and *Trend Micro, Inc.* (USA), Civil Action No. 1:10-cv-01067, United States District Court for the District of Delaware, filed Jan. 14, 2013; 2 pages.

Court Docket History for Civil Action No. 1:10-cv-01067, *Intellectual Ventures I LLC*, v. *Check Point Software Technologies Ltd.* et al., filed Dec. 8, 2010; last downloaded Jan. 25, 2013; 53 pages.

Court Docket History for Civil Action No. 1:10-cv-01067, *Intellectual Ventures I LLC*, v. *Check Point Software Technologies Ltd.* et al., filed Nov. 21, 2012; last downloaded Jan. 25, 2013; 4 pages.

COMPUTER VIRUS SCREENING METHODS AND SYSTEMS

CROSS-REFERENCE TO RELATED APPLICATIONS

This application is a continuation of U.S. patent application Ser. No. 10/810,443, filed Mar. 26, 2004, issuing as U.S. Pat. No. 7,774,840, which is a continuation of U.S. patent application Ser. No. 10/196,892, filed Jul. 16, 2002 (now abandoned), which is a continuation of U.S. patent application Ser. No. 10/153,466, filed May 21, 2002 (now abandoned), which is a continuation of U.S. patent application Ser. No. 09/383,885 (now U.S. Pat. No. 6,397,335), filed Aug. 26, 1999, which is a continuation of U.S. patent application Ser. No. 09/022,512 (now U.S. Pat. No. 5,987,610), filed Feb. 12, 1998, each of which is hereby incorporated by reference in its entirety.

This application is related to U.S. application Ser. No. 10/000,757, filed Nov. 30, 2001 (now abandoned), which is a continuation of U.S. application Ser. No. 09/022,512, which are all incorporated by reference herein in their entireties.

This application is related to U.S. application Ser. No. 10/985,642, filed Nov. 10, 2004 (now U.S. Pat. No. 7,363,655), which is a continuation of U.S. application Ser. No. 10/153,466, which is a continuation of U.S. application Ser. No. 09/383,885, which is a continuation of Ser. No. 09/022,512, each of which is incorporated by reference herein in its entirety.

TECHNICAL FIELD

The present invention relates to methods and systems for detecting a computer virus in computer data.

BACKGROUND OF THE INVENTION

Many computer users have virus screening and detection software installed on their computers. Such software directs a computer to screen computer data received from diskettes and/or downloaded from online services. If a virus or a like deleterious program is detected, the software directs the computer to remove the virus from the computer data. If undetected, a virus in a computer file can infect other computer files to produce various unwanted results.

Subsequent revisions of virus screening software are created and released as additional computer viruses are discovered. Consequently, each computer user has to repeatedly upgrade the virus screening software installed on his/her computer to ensure protection from recently-discovered viruses.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Embodiments of the present invention advantageously screen computer data for viruses within a telephone network before communicating the computer data to an end user. As a result, end users can download computer data via the telephone network without concern of receiving various predetermined computer viruses.

For this application, the term "virus" should be construed as inclusive of computer viruses, worms, trojan horses, and other like deleterious data.

Figure 1:
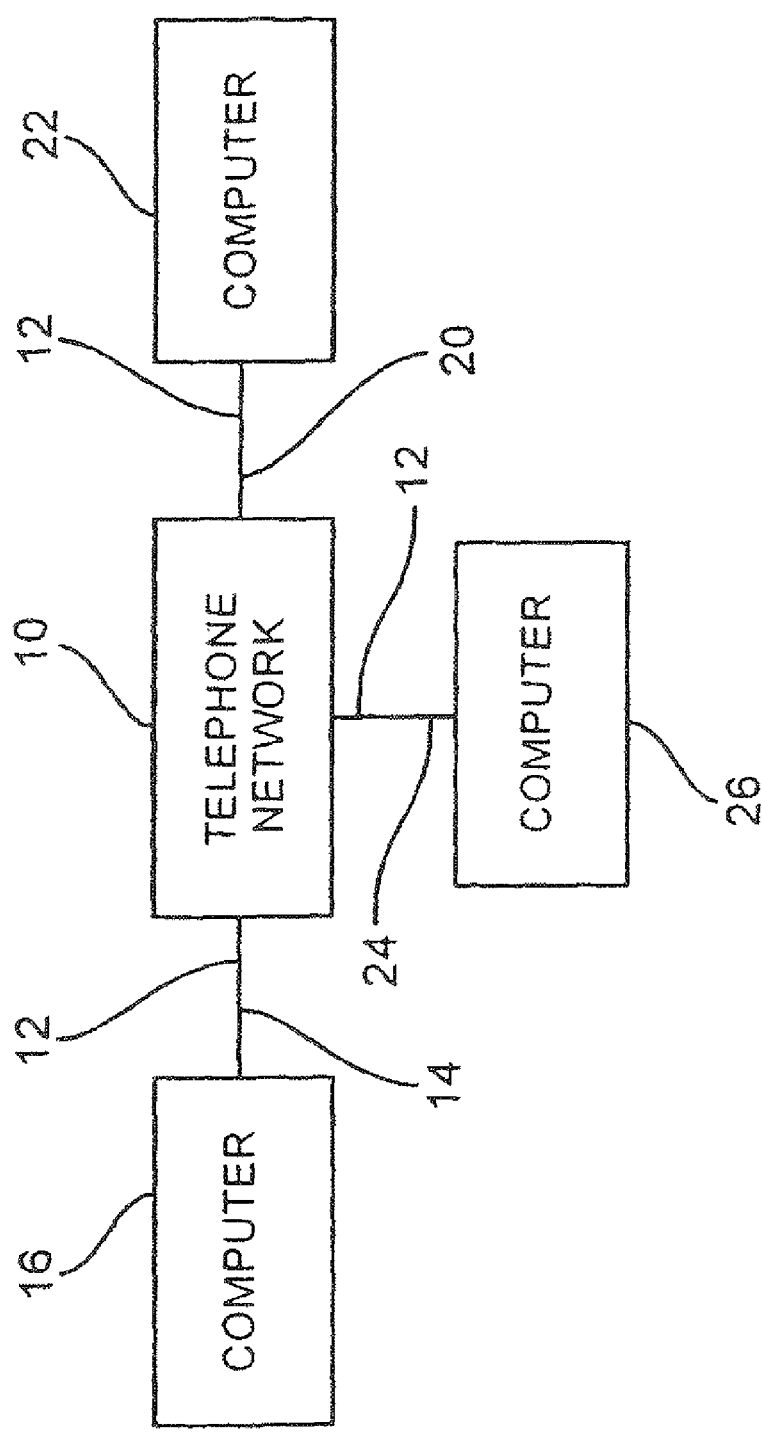
FIG. 1 is a block diagram of a virus-screening telecommunication system in accordance with the present invention.

FIG. 1 is a block diagram of a virus-screening telecommunication system in accordance with the present invention. The telecommunication system includes a telephone network 10 to serve a plurality of telephone lines 12. Preferably, the telephone network 10 includes a public telephone network such as a public switched telephone network to communicate signals between pairs of telephone lines. Alternatively, the telephone network 10 includes a private telephone network or a virtual private telephone network to communicate signals between pairs of telephone lines. Regardless of its form, the telephone network 10 can include any combination of one or more end offices, central offices, tandem offices, switching offices, service switching points (SSPs), signal transfer points (STPs), service control points (SCPs), and/or other nodes to communicate signals between pairs of telephone lines.

Typically, each of the telephone lines 12 communicates to at least one end station at a corresponding customer premise. Examples of end stations include, but are not limited to, telephones, facsimile machines, and computers. The telephone lines 12 can include digital telephone lines to communicate digital signals to various ones of the customer premises, and/or analog telephone lines to communicate analog telephone signals to others of the customer premises.

For purposes of illustration, the telephone lines 12 include a telephone line 14 in communication with a computer 16, a telephone line 20 in communication with a computer 22, and a telephone line 24 in communication with a computer 26. Although not specifically illustrated, it is noted that the telephone lines 12 can further include a multitude of additional telephone lines in communication with additional end stations.

Typically, the telephone network 10 provides a communication path between a telephone line associated with a calling party and telephone line associated with a called party. In this case, the telephone network 10 receives a telecommunication code associated with the called party (e.g. a telephone number of the called party) from the calling party. For example, a modem associated with the computer 22 may dial a telephone number associated with the telephone line 24 to initiate communication with the computer 26.

The telephone network 10 provides the communication path between the calling party and the called party in response to receiving the telecommunication code. Continuing with the aforementioned example, the telephone network 10 provides a communication path between the telephone line 20 and the telephone line 24 in response to receiving the dialed telephone number.

In the aforementioned example and other computer communication applications, the telephone network 10 receives signals representative of computer data from a first party for transmission to a second party. The signals can include digital signals such as those from an ISDN line, or analog signals such as those generated by a modem.

Before communicating the computer data to the second party, the telephone network 10 screens the computer data for at least one virus. In general, the computer data can be screened at any node in the telephone network 10. For example, the computer data can be screened at an end office, a central office, a tandem office, a service switching point, or any other switching office which provides a communication path between the first party and the second party. Alternatively, the computer data can be screened by a remote processor which serves one or more end offices, central offices, tandem offices, service switching points, or other switching offices of the telephone network 10.

If no viruses are detected in the screening step, the computer data are communicated to the second party. If a virus is detected in the computer data, the telephone network 10 can perform one or more actions including but not limited to: (i) inhibiting communication of at least a portion of the computer data to the second party; (ii) removing the virus from the computer data prior to transferring the data to the second party; (iii) communicating a message indicating that a virus was detected to the second party; (iv) communicating a message indicating that a virus was detected to the first party; and (v) writing data to a database indicating that a virus was detected. A preferred embodiment of a virus screening method is subsequently described in detail with reference to FIG. 3.

In this way, the telephone network 10 provides a virus screening service to automatically screen computer data for viruses. By screening the computer data for specific viruses prior to its delivery to an end user, the computer data need not be screened for those viruses by the end user's computer. Preferably, the telephone network 10 is capable of providing the virus screening service to a plurality of contemporaneous calls.

The virus screening service may be selectively provided only to telephone lines subscribing thereto. For example, an end user may subscribe to a virus screening service to screen all computer data directed to his/her telephone line from Internet service providers, online services, computer servers, and other dial-up computers. Alternatively, a service provider may subscribe to the virus screening service to protect its users from computer viruses by screening its transmitted computer data. In either of these cases, the telephone network 10 can include a database which determines whether or not the virus screening service is applied to data communicated in a telephone call.

Virus screening can be facilitated in the telephone network 10 using either a conventional telephone network processor adapted to run associated virus screening software or an additional processor which runs virus screening software. For a circuit-switched connection between the two parties, the telephone network 10 determines and secures an appropriate path for the duration of the call. If virus screening is to be applied, the path can be determined to include a route through a processor which examines the contents of information being passed during the call. In general, the processor can examine data packets carried by either a modulated analog signal or as part of an ISDN payload. If virus screening is not to be applied to the call, the routing of the call may differ so as not to employ the processor.

The processor can augment conventional circuit-switched network elements, and may be located anywhere in the telephone network 10. The processor can be housed with a central office using a heavy duty line card, for example, or can be associated with an AIN (Advanced Intelligent Network) node.

Before describing a preferred embodiment of a virus screening method in accordance with the present invention, an example of the telephone network 10 to screen computer data is described with reference to FIG. 2

Figure 2:
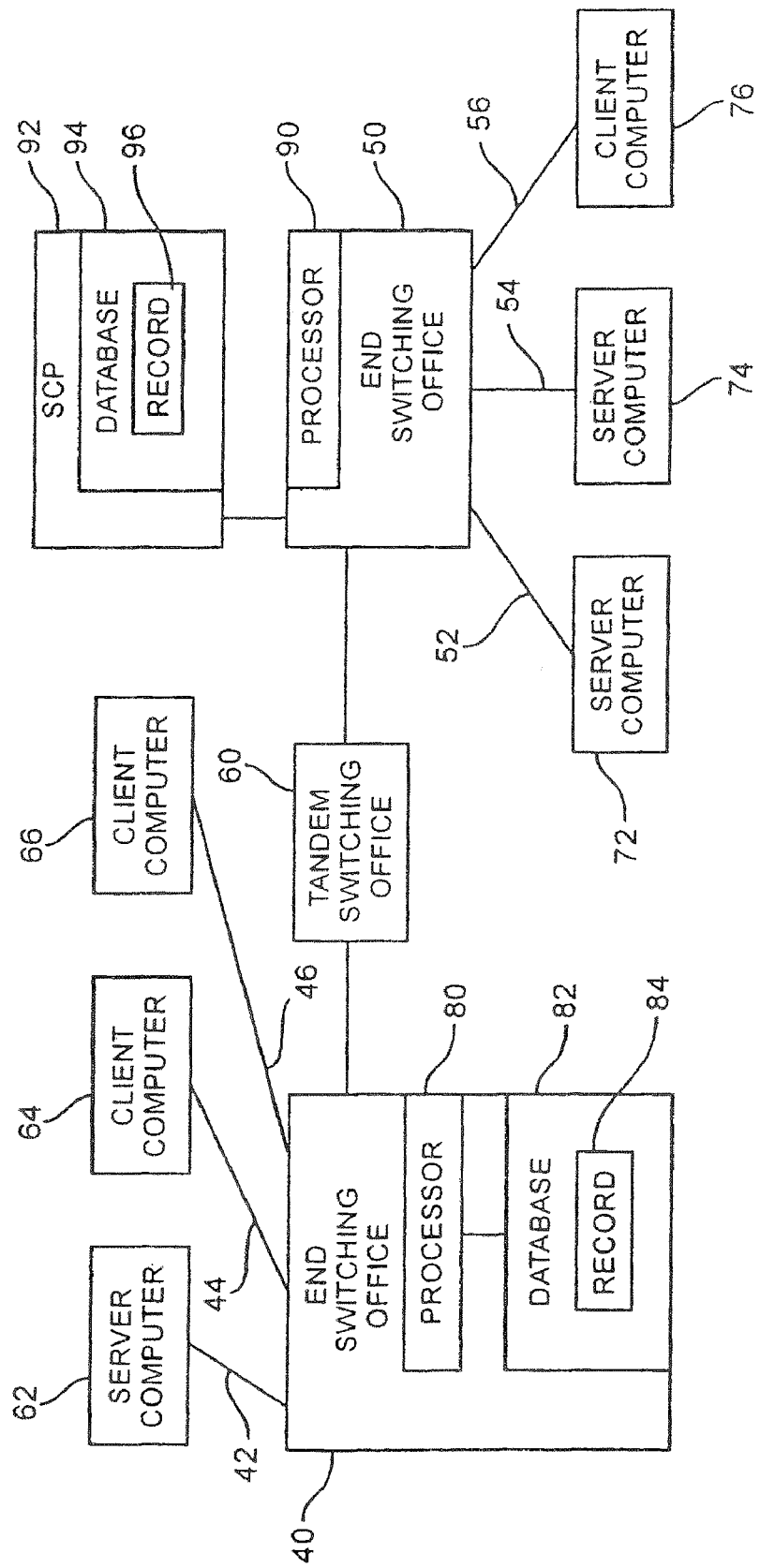
FIG. 2 is a block diagram of an example of a virus-screening telephone network.

FIG. 2 is a block diagram of an example of a virus-screening telephone network. The telephone network includes an end switching office 40 serving telephone lines 42, 44, and 46, and an end switching 50 serving telephone lines 52, 54, and 56. The end switching offices 40 and 50 communicate either directly or via a tandem switching office 60.

The telephone line 42 is associated with a server computer 62. The server computer 62 can be associated with an Internet service provider, an online service, or another dial-up computer, for example. For example, although not specifically illustrated, the Internet service provider can comprise a gateway to communicate with the server computer 62 via the Internet, and a modem bank to couple the gateway to the telephone line 42. Additionally, the Internet service provider can provide various firewalls, directory servers, and other known features.

The telephone lines 44 and 46 are associated with client computers 64 and 66, respectively. The client computers 64 and 66 can be associated with end users of one or more Internet service providers, online services, or other dial-up computers, for example.

The telephone lines 52 and 54 are associated with server computers 72 and 74, respectively. The server computers 72 and 74 can be associated with other Internet service providers, online services, or dial-up computers, for example. The telephone line 56 is associated with a client computer 76. The client computer 76 can be associated with another end user of one or more Internet service providers, online services, or other dial-up computers, for example.

Associated with the end switching office 40 is a computer including a processor 80 to screen computer data received thereby for a plurality of viruses. Also associated with the end switching office 40 is a database 82 indicating which of the telephone lines 42, 44, and 46 subscribe to the virus screening service. For purposes of illustration and example, the database 82 includes a record 84 indicating that all computer data directed to the telephone line 44 is to be screened for viruses.

The end switching office 50 has a computer including a processor 90 associated therewith to screen computer data for a plurality of viruses. The end switching office 50 performs call processing operations responsive to a signal control point (SCP) 92. The signal control point 92 includes a database 94 indicating which of the telephone lines 52, 54, and 56 subscribe to the virus screening service. For purposes of illustration and example, the database 94 includes a record 96 indicating that all computer data received from the telephone line 54 is to be screened for viruses.

In this example, the processor 80 associated with the end switching office 40 screens all computer data to be directed to the telephone line 44. Hence, the end user associated with the telephone line 44 can connect to and download data from the server computers 62, 72, and 74 without concern of receiving various predetermined computer viruses. The processor 90 associated with the end switching office 50 screens all computer data communicated along the telephone line 54 from the server computer 72. Hence, end users associated with the telephone lines 44, 46, and 56 can connect to and download data from the server computer 72 without concern of receiving various predetermined computer viruses.

It is noted that the tandem switching office 60 can include a virus-screening processor, if desired. In this case, the processor selectively screens computer data communicated between the end switching offices 40 and 50.

As is well known, each of the virus-screening processors can have one or more associated modems to modulate computer data for transmission, and to demodulate received computer data.

The herein-described virus-screening processors can provide or assist in providing a proxy server or a functional equivalent of a proxy server. As subsequently described in more detail, the virus-screening processors can re-partition received data, e.g. create new packets based upon received packets, before communicating data to the client computer. In these cases, the virus-screening processor can create and communicate modified protocol-specific information such as a number of packets to be received, error detection and correction information, and packet serial numbers.

Preferably, each virus-screening processor has an associated memory device to store at least two packets. As subsequently described herein, the virus-screening processor can receive a packet and determine whether the packet can be immediately forwarded to the client computer, or if the packet is to be stored in the memory device for further analysis.

Figure 3:
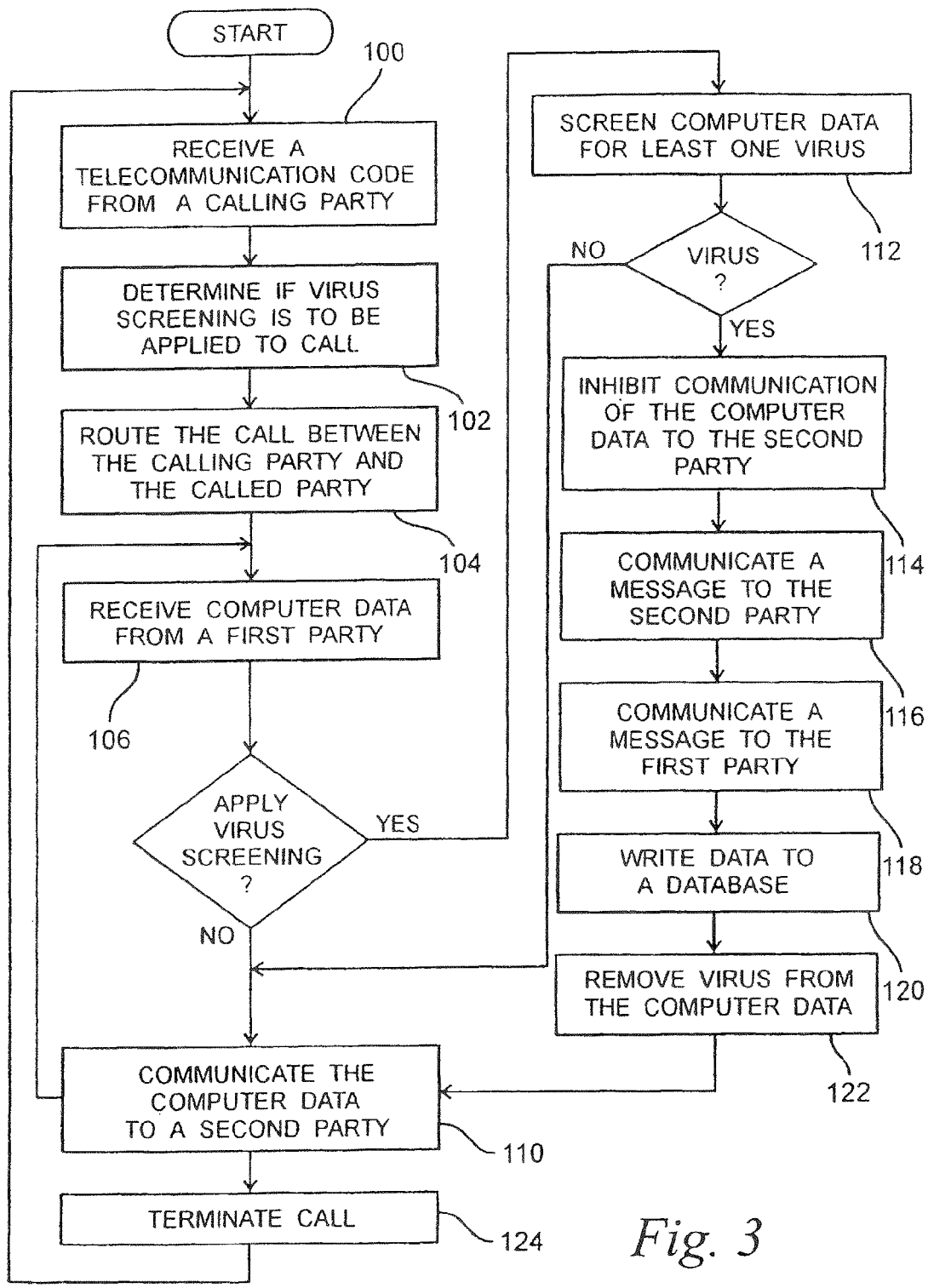
FIG. 3 is a flow chart of an embodiment of a virus screening method in accordance with the present invention.

FIG. 3 is a flow chart of an embodiment of a virus screening method in accordance with the present invention. As described earlier, the virus screening method can be performed at any node of a telephone network.

As indicated by block 100, the method includes a step of receiving a telecommunication code from a calling party. Typically, the telecommunication code includes dialing digits such as a telephone number associated with a called party.

As indicated by block 102, the method includes a step of determining if at least one of the calling party and the called party is a subscriber to a virus screening service. This step can include sending a query to a database, and receiving a call-handling message in response to the query, preferably using the facilities of an Advanced Intelligent Network. The query can include an identification code of the calling party and/or an identification code of the called party.

The call-handling message can include an indication of whether or not virus screening is to be applied for a call between the calling party and the called party. Further, the call-handling message can include an indication of whether or not virus-screening is to be applied unidirectionally from the calling party to the called party, unidirectionally from the called party to the calling party, or bidirectionally between the calling party and the called party.

As indicated by block 104, the method includes a step of routing a call between the calling party and the called party. The call is directed to the called party based upon the telecommunication code received from the calling party.

It is noted that routing of the call through the telephone network 10 can differ depending on whether or not virus screening is to be applied. If virus screening is to be applied to a call, for, example, the SCP 92 can direct the call to be routed through a network node appropriately equipped for virus screening. This is of particular interest if virus screening is not offered at a central office communicating the call. Alternatively, if a customer does not want virus screening to be applied, or if the call is not being directed to a telephone number known to require screening, then a more direct, less expensive route can be selected.

As indicated by block 106, the method includes a step of receiving computer data from a first party of the called party and the calling party. The step of receiving the computer data can include receiving a signal which encodes the computer data. The signal can include a digital signal or an analog signal encoding the computer data. Optionally, the step of receiving the computer data includes demodulating the signal to recover the computer data encoded thereby.

In many applications, the computer data has an executable program and/or an installation program associated therewith. The installation program can be either included in the computer data (e.g. a custom installer program) or absent from the computer data (e.g. a generic installer program). The generic installer program typically resides on the client computer prior to receiving the computer data (e.g. the generic installer program can be bundled with the operating system).

If virus screening is not to be applied to the call, a step of communicating the computer data to a second party of the called party and the calling party is performed as indicated by block 110. The step of communicating the computer data can include modulating a signal based upon the second computer data to form a modulated signal, and communicating the modulated signal to the second party.

If virus screening is to be applied to the call, a step of screening the computer data for at least one virus is performed as indicated by block 112. Preferably, the step of screening the computer data includes screening the computer data for a plurality of predetermined computer viruses. This step can include a step of storing one or more packets or blocks of computer data to facilitate virus scanning over a plurality of packets or blocks. A preferred embodiment of a method of screening the computer data is described with reference to FIG. 4.

If no virus is detected, the computer data is communicated to the second party as indicated by block 110. If a virus is detected, at least one of the steps indicated by blocks 114, 116, 118, 120, and 122 is performed.

Typically, the computer data is comprised of a plurality of data packets. After examining the contents of one of the data packets, the packet can be either immediately forwarded to the second party or held for further analysis. Several packets can be held before being forwarded to the second party so that their contents can be examined as a group (which may be required using the method described with reference to FIG. 4). By examining several packets, a virus signature which extends over the boundary of a single packet can be detected.

Block 114 indicates a step of inhibiting communication of the computer data to the second party. By performing this step, the computer data which contains the virus is blocked from being transferred to the second party.

Block 116 indicates a step of communicating a message to the second party indicating that a virus was detected. Optionally, the message includes an indication of which virus was detected. Preferably, the message is in an HTML (hypertext marking language) format to facilitate display using a wide variety of client software programs (such as Internet browser programs) using a wide variety of operating systems (e.g. MacOS, Windows 95, and Windows NT).

Block 118 indicates a step of communicating a message to the first party indicating that a virus was detected. Optionally, the message includes an indication of which virus was detected.

Block 120 indicates a step of writing data to a database indicating that a virus was detected. This step is beneficial in applications where a message cannot be readily accepted by the first party. An example of such an application is where the first party includes a server which only downloads data." The message can include an indication of which virus was detected, and a date and a time of detecting the virus. The first party can subsequently access the database to determine if any viruses were detected.

Block 122 indicates a step of removing the virus from the computer data to form second computer data. Thereafter, the second computer data is communicated to the second party in the step indicated by block 110. These steps act to clean the computer data prior to communicating the data to the second party.

The step of communicating the second computer data (block 110) can also include appropriate modification of information, such as that which pertains to error correction that was encoded in the original data but which is no longer descriptive of the new data. This step can also include ensuring the integrity of the physical transport layer, as is well known by those having ordinary skill in the art.

The step of communicating the second computer data can include generating a signal based upon the second computer data, and communicating the signal to the second party. The signal can be generated in accordance with a format for a digital line (e.g. ISDN, T1, and xDSL). Alternatively, the signal can be generated by modulating a signal based upon the second computer data to form a modulated signal. The modulated signal can be communicated to the second party using an analog line.

After performing the step indicated by block 110 or at least one of the steps indicated by blocks 114, 116, 118, 120, and 122, flow of the method can be directed back to block 106 to receive further computer data, or to block 124 wherein the call is terminated. After the call is terminated, flow of the routine can be directed back to block 100 to facilitate a subsequent call. The subsequent call can have the same calling party or a different calling party, and can have the same called party or a different called party.

Figure 4:
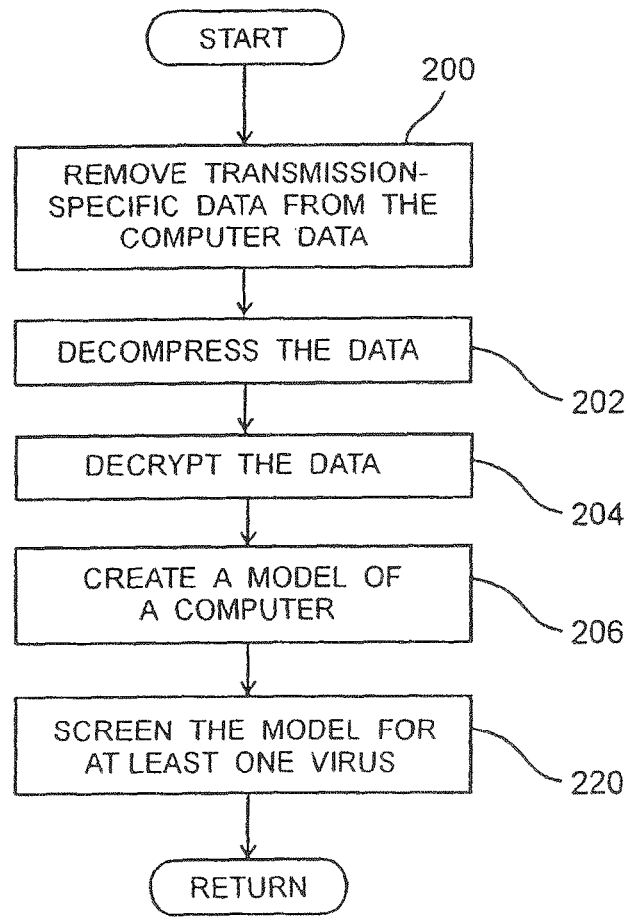
FIG. 4 is a flow chart of an embodiment of a method of screening the computer data for at least one virus.

FIG. 4 is a flow chart of an embodiment of a method of screening the computer data for at least one virus. As indicated by block 200, the method includes a step of removing transmission-specific data from the computer data to form second data. Preferably, the transmission-specific data which are removed include headers and checksums within the computer data.

If the computer data is formatted in accordance with a point-to-point protocol (PPP) or another high-level data link control (HDLC), the virus-screening processor runs PPP to separate the information field or payload from the framing fields. The framing fields which are removed can include a begin flag, an address field, a control field, a protocol field, a frame check sequence field, and an end flag.

The payload within the information field may be formatted in accordance with an other protocol, such as an internet protocol (IP). In this case, the payload includes the follow fields: a version, a header length, a type of service, a total length, an identification field, flags, fragment offset, time to live, protocol, header checksum, source internet address, destination internet address, options and padding, and data. The virus-screening processor can run IP to remove all fields but the data field.

If the computer data is received in accordance with TCP (transmission control protocol), the virus-screening processor runs TCP to ensure that packets communicated within the data field are received in a correct sequence, and to request re-transmission of any lost or corrupted packets. If the another protocol such as FTP (file transfer protocol) is built on top of TCP, the virus-screening processor runs FTP to further process the data to form the second data.

Copies of both the original computer data and the second data are maintained. The original computer data and the second data can be maintained in a memory associated with the virus-screening processor.

As indicated by block 202, a step of decompressing the second data is performed if the second data is compressed. As indicated by block 204, a step of decrypting the second data is performed if the second data is encrypted. By performing these steps, third data is produced which is decompressed and decrypted.

As indicated by block 206, the method includes a step of creating or otherwise providing a model of a client computer. The model is provided by a virus screening computer other than the client computer. The virus-screening computer includes the herein-described virus-screening processor and its associated memory.

The model is loaded with the third data (which is the same as the second data if the second data is uncompressed and not encrypted). If the third data includes an executable program such as an installation program or a plug-in program for a Web browser, the executable program is installed. The installation program can be either generic or part of the third data. An embodiment of a method of creating the model is described with reference to FIG. 5.

Figure 5:
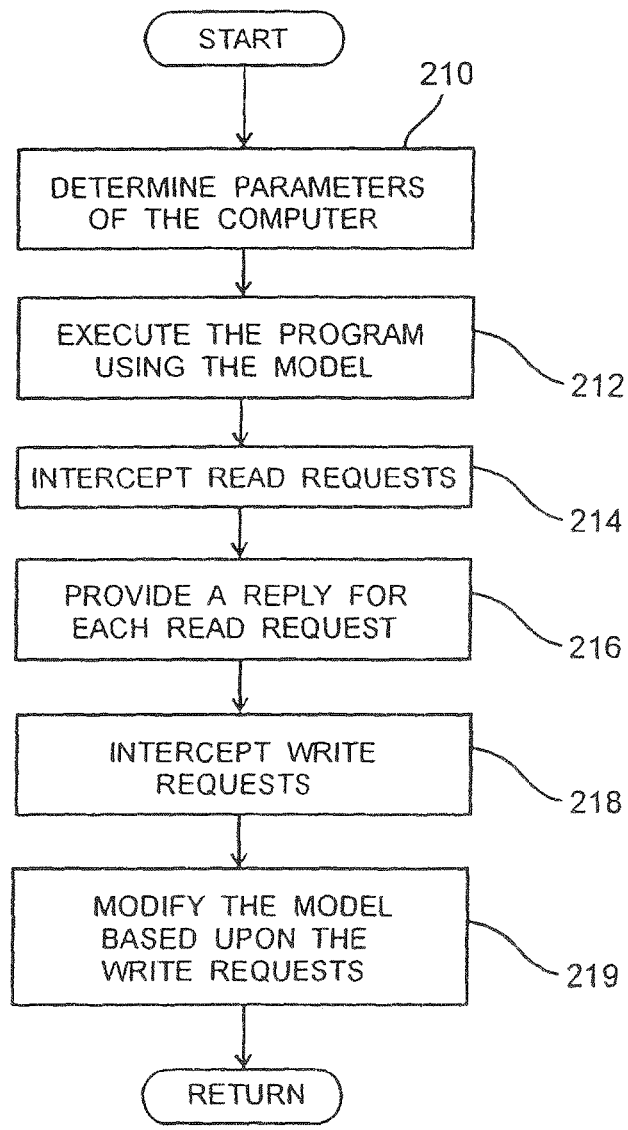
FIG. 5 is a flow chart of an embodiment of a method of creating a model of a client computer.

FIG. 5 is a flow chart of an embodiment of a method of creating a model of a client computer. As indicated by block 210, a step of determining basic parameters of the client computer is performed. The parameters can include a version of an operating system, a hardware type, registry information, configuration information, and information from initialization files such as ".ini" files. The parameters are used in subsequently described intercept routines.

The parameters can be determined when a customer subscribes to a virus-screening service, and maintained by a database. The parameters in the database can also be updated from time to time by communicating with the client computer.

As indicated by block 212, a step of executing the installation program is performed. The installation program is executed using the virus-screening processor and its associated memory.

As indicated by block 214, a step of intercepting read requests generated by the installation program is performed. Typically the read requests include requests for information about the environment of the client computer.

In response to each request, a step of providing a reply message to the installation program is performed as indicated by block 216. The reply message is generated by gathering information from the model of the client computer and passing the information to the installation program.

The model is at least partially created by one or more of the following steps: (i) requesting the information from the client computer; (ii) obtaining the information from the model if the information was created or altered by the installation program; and (iii) requesting the information from a pre-existing image of the client computer. The pre-existing image of the client computer mimics the state of the client computer by maintaining a copy of settings and data stored to the client computer. By requesting the information from the pre-existing image, the information can be gathered locally rather than by communicating with the client computer.

When the installation program attempts to change the environment of the client computer using a write request, the write request is intercepted (block 218) and changes are made only to the model of the client computer stored in the memory (block 219). In this way, the environmental changes attempted by the installation program are cached. If the installation program later attempts to read those changes, the read requests are intercepted and directed to the cache rather than to the client computer.

The processing of read and write requests is performed in an order determined by the execution of the installation program. For example, an operating system may change an order of write requests depending on an object to which a write request is directed. If an operating system queues write requests to several devices, the actual order in which the write operations are performed may differ based upon how busy or how fast the devices are. An operating system may also vary the order of read requests depending on system or device status. The order of read requests can be varied using an intelligent look-ahead since one read request may fetch data for another read request. In general, the order of read and write requests can vary from one execution to another based upon interaction between the installation program and the model of the operating system.

Once execution of the installation program has completed, the model reflects a state functionally equivalent to that of the client computer if the client computer had executed installation program. The state of the model and the state the client computer would have had if the installation program were executed need not be identical, but are equivalent from the perspective of the virus scanning software. For example, the virus scanning software may not attempt to duplicate all the display drivers that are installed on a non-standard workstation since these drivers might be dynamically loaded at execution time from a LAN or from a removable mass storage device. Consequently, the model and the client might not assume identical states, but would have states that were functionally equivalent as far as the virus scanning software is concerned.

Referring back to FIG. 4, the method includes a step of scanning or otherwise screening the model for at least one virus, as indicated by block 220. Any of a variety of virus screening methods can be performed in this step. The results of this step are communicated to the end user. The end user can decide whether to accept or reject the computer data based upon the results. If the end user accepts the computer data, the computer data is transmitted to the client computer. Thereafter, the client computer can execute the installation program to proceed with the installation process.

It is noted that if the model either equivalently models or substantially equivalently models the client computer, there is no need for the client computer to perform the installation process. Instead, changes to the model can be communicated to client computer. In this case, the changes to the model can be written to the client computer using either no explicit installation program or a much simplified installation program. A case in which the model may significantly differ from the client computer is when changes are made to the client computer while the virus-screening processor is scanning the computer data.

A simplified installation program can be created and communicated to the client computer as follows. Handshake packets for the original installation program which indicate, for example, a number of packets to expect in a download and error correction/detection information, are intercepted by the virus screening processor. The virus screening processor creates a new installation program to be sent in addition to an executable program. The new installation program provides information for changing other system files in accordance with the instructions included in the original installation program.

Advantageously, the new installation program may contain less data than the original installation program, although additional data may be required for the executable program. In some cases, the need for a new installation program may be eliminated. For example, an ANSI-standard C program that only needs to be decompressed and is always put in some known standard directory on the client computer may not require an installation program.

The virus screening processor creates new handshake packets for the new data payload comprised of the new installation program and the executable program. The new handshake packets and the new data payload can then be communicated to the client computer. Preferably, the virus screening processor provides proxy server functionality to effectuate this process.

Once received at the client computer, the new installation program can be executed. In some cases, the installation is performed manually either by relying on an end user's general knowledge of how a new program can be made accessible to the system or by providing explicit installation instructions. In these cases, the installation instructions in the new installation program can include installation instructions provided by the original installation program. Alternatively, the new installation program can provide modified installation instructions created using well-understood procedures.

In other cases, the installation process is either partially or wholly automatic. In these cases, the original installation process can be forwarded, or a new installation process can be created using well-understood procedures.

Figure 6:
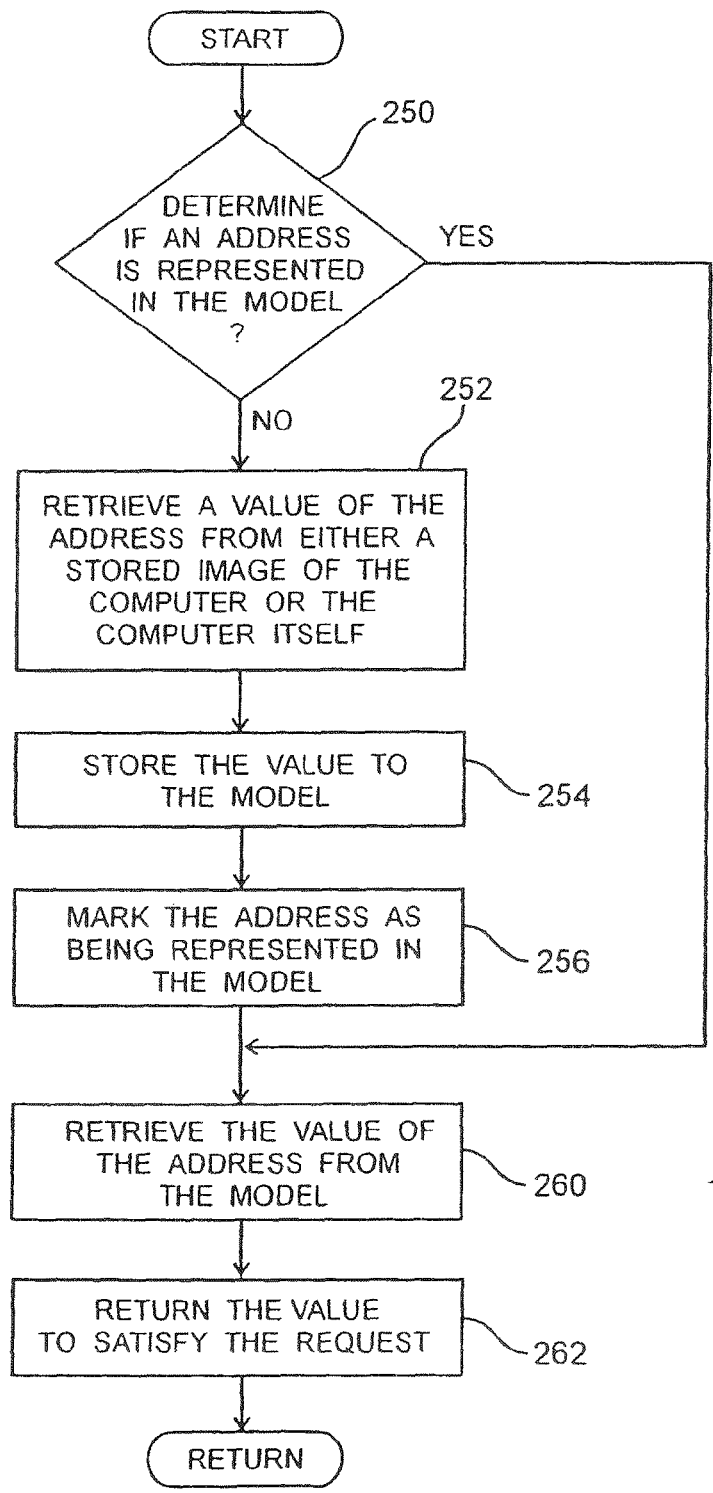
FIG. 6 is a flow chart of an embodiment of a process to intercept and fulfill a read request.

FIG. 6 is a flow chart of an embodiment of a process to intercept and fulfill a read request. The process can be performed within the steps indicated by blocks 214 and 216 described with reference to FIG. 5. The process can be performed by a subroutine of a main virus-screening program.

In a simple read step, the installation program asks that a specified range of memory locations or addresses, either in RAM (random access memory) or some other memory device, be read. The hereinafter-described process is performed for each address to be read.

As indicated by block 250, the process includes a step of testing or otherwise determining if the address is represented in the model. If the address is not represented in the model, then a step of retrieving a value of the address from either a stored image of the client computer or from the client computer itself is performed (as indicated by block 252). Thereafter, steps of copying or otherwise storing the value to the model (as indicated by block 254) and marking the address as being represented in the model (as indicated by block 256) are performed.

The process includes a step of retrieving the value of the address from the model (as indicated by block 260). A step of returning the value is performed (as indicated by block 262) to satisfy the request from the installation program.

The aforementioned simple read process can be augmented to perform a read-with-consequences process. The read-with-consequences process further includes one or more system action steps such as changing pointers, or incrementing or decrementing counters. The extrapolation of the aforementioned simple read process to a read-with-consequences process is clear from well-known principles of software emulation.

Figure 7:
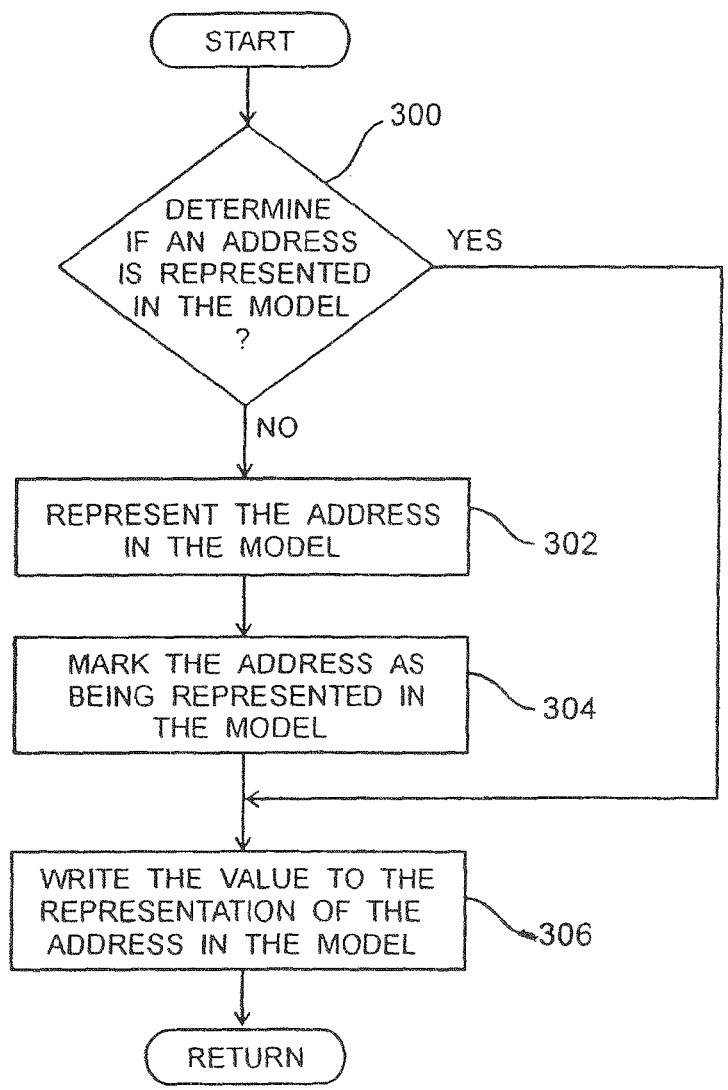
FIG. 7 is a flow chart of an embodiment of a process to intercept and fulfill a write request.

FIG. 7 is a flow chart of an embodiment of a process to intercept and fulfill a write request. The process can be performed within the steps indicated by blocks 218 and 219 described with reference to FIG. 5.

In a simple write step, the installation program asks that a specified range of memory locations or addresses, either in RAM or some other memory device, be written. The hereinafter-described process is performed for each address to be written.

As indicated by block 300, the process includes a step of testing or otherwise determining if the address is represented in the model. If the address is not represented in the model, then steps of representing the address in the model (as indicated by block 302) and marking the address as being represented in the model (as indicated by block 304) are performed. Once the address is represented in the model, a step of writing the value to the representation of the address in the model is performed (as indicated by block 306).

The aforementioned simple write process can be augmented to perform a write-with-consequences process. The write-with-consequences process further includes one or more system action steps such as changing pointers, or incrementing or decrementing counters. Another example of a system action step includes triggering an interrupt or another system action in response to writing to one of a plurality of special addresses monitored by the operating system. The extrapolation of the aforementioned simple write process to a write-with-consequences process is clear from-well-known principles of software emulation.

Although the processes described with reference to FIGS. 6 and 7 are based upon intercepting read and write requests at a low level of computing abstraction, it is noted that requests at any level (e.g. a higher level such as the level of operating system calls) can be intercepted using well-known methods of software emulation. Regardless of the level of abstraction, the installation program builds its environmental requests from basic steps including a simple read step, a simple write step, a read-with-consequences step, and a write-with-consequences step.

Many variations of the herein-described embodiments of the present invention can be formulated. In cases where a telephone line is used for both data communication and voice communication, the herein-described methods and systems can be modified to determine if a call is a voice call or a data call, to disable virus screening for the voice call, and to enable virus screening for the data call.

A further variation is to have the virus screening service be an on-demand service as an alternative to or in addition to being a subscription service. In this case, the end user can prefix the dialing digits of a data call with a code to enable screening. The code can have the form of *NN, where each N indicates a corresponding dialing digit. The end user may omit the *NN code when placing a voice call or calling a trusted data source. The herein-described methods and systems can be modified to detect the *NN code to enable virus screening.

It is noted that the herein-described methods and systems can use a data decompressor to decompress data. Once decompressed, the data can be screened for viruses. Thereafter, a data compressor can compress the data to communicate to a receiving party. Similarly, the herein-described methods and systems can decrypt data prior to virus screening. This is beneficial for detecting newer varieties of viruses which are present on encrypted data, and may be undetectable until decrypted. Thereafter, the data can be encrypted back to its original form if no virus is present.

It is also noted that virus screening can be performed on an entire file before communicating the file to a receiving party. Alternatively, the virus screening can be performed in-line by partitioning the file into small blocks of data, screening each block of data, and communicating each virus-free block data upon being screened. As is apparent from the embodiment described with reference to FIG. 4, before any block of data can be declared virus-free, it may be necessary to examine one or more succeeding blocks since a virus signature could extend over several blocks of data.

As another variation, the herein-described methods and systems can allow virus screening to be enabled and disabled one or more times during a single session. In this case, the virus-screening processor can receive an enable message or a disable message from either the transmitting party or the receiving party. The virus-detecting processor enables virus screening in response to receiving the enable message, and disables virus screening in response to receiving the disable message. Typically, the enable message or the disable message is generated by the computer of the receiving party.

It is further noted that the herein-described methods and systems can perform virus screening separately on each of a plurality of virtual channels included in an interactive session. In this case, received data are separated into logical streams, and each stream is independently screened. Virus-free streams are reconstructed prior to communicating the data to the receiving party. In this way, the system is operative when there are multiple data streams defined between a client and a server.

Many applications that use TCP/IP include a provision for a version of the Berkeley UNIX "sockets" API to establish multiple data streams from one or more servers to the client. There are also Remote Procedure Calls API developed by Sun Microsystems for this purpose. Along with the herein-described protocol analysis, steps of examining the information requests and responses to detecting opening and closing of sockets (or their equivalents) are performed in these cases to segregate a data stream into logical channels.

Still further, it is noted that the virus screening methods and systems described in U.S. Pat. Nos. 5,319,776 and 5,623,600, which are hereby incorporated by reference into this disclosure, can be used in embodiments of the present invention.

It is also noted that each of the methods described herein can be directed by an article of manufacture comprising a computer-readable storage medium and computer-readable data stored thereby. Examples of the article include an electronic storage medium having electronic data, a magnetic storage medium having magnetic data, and an optical storage medium having optical data.

FIGS. 8 to 11 show alternative embodiments of virus screening systems. These virus screening systems include a service bureau to perform the herein-described virus screening methods.

Figure 8:
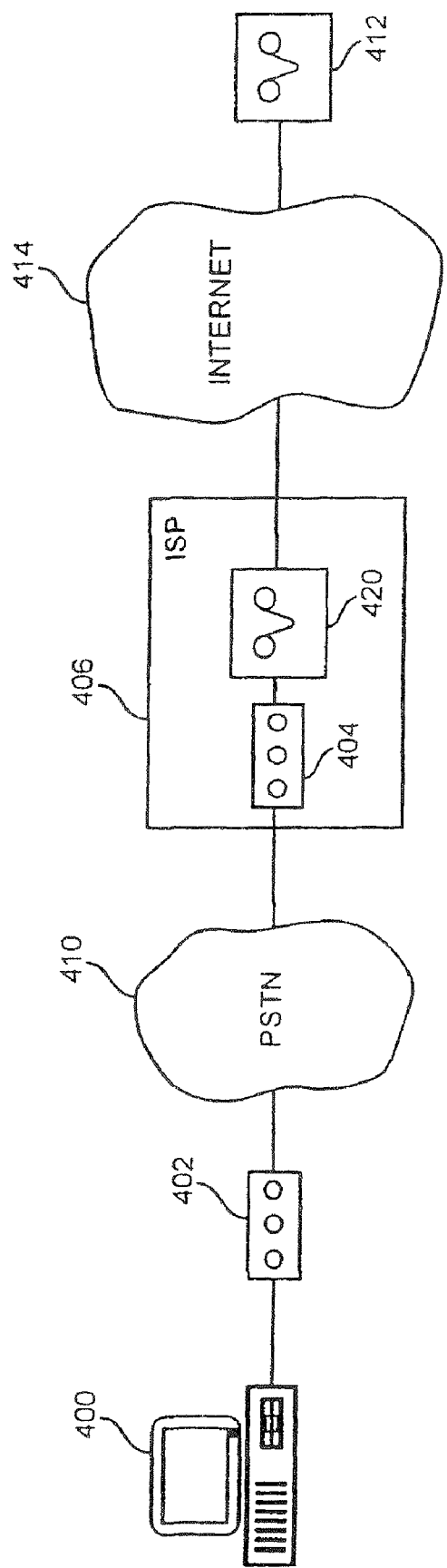
FIG. 8 is a schematic diagram of a first alternative embodiment of a virus screening system.

FIG. 8 is a schematic diagram of a first alternative embodiment of a virus screening system. A user computer 400 having a modem 402 communicates with a modem 404 associated with an internet service provider 406. The modems 402 and 404 communicate via a public switched telephone network 410. Other connection means such as an integrated service digital network (ISDN), a digital subscriber line (DSL), or cellular data can be used to link the user computer 400 to the internet service provider 406.

The internet service provider 406 communicates with a data source 412 via the Internet 414. The internet service provider 406 includes a service bureau 420 to download data from the data source 412 as requested by the user computer 400. The service bureau 420 screens the data for at least one virus, and communicates the data to the user computer 400 if no viruses are detected.

Figure 9:
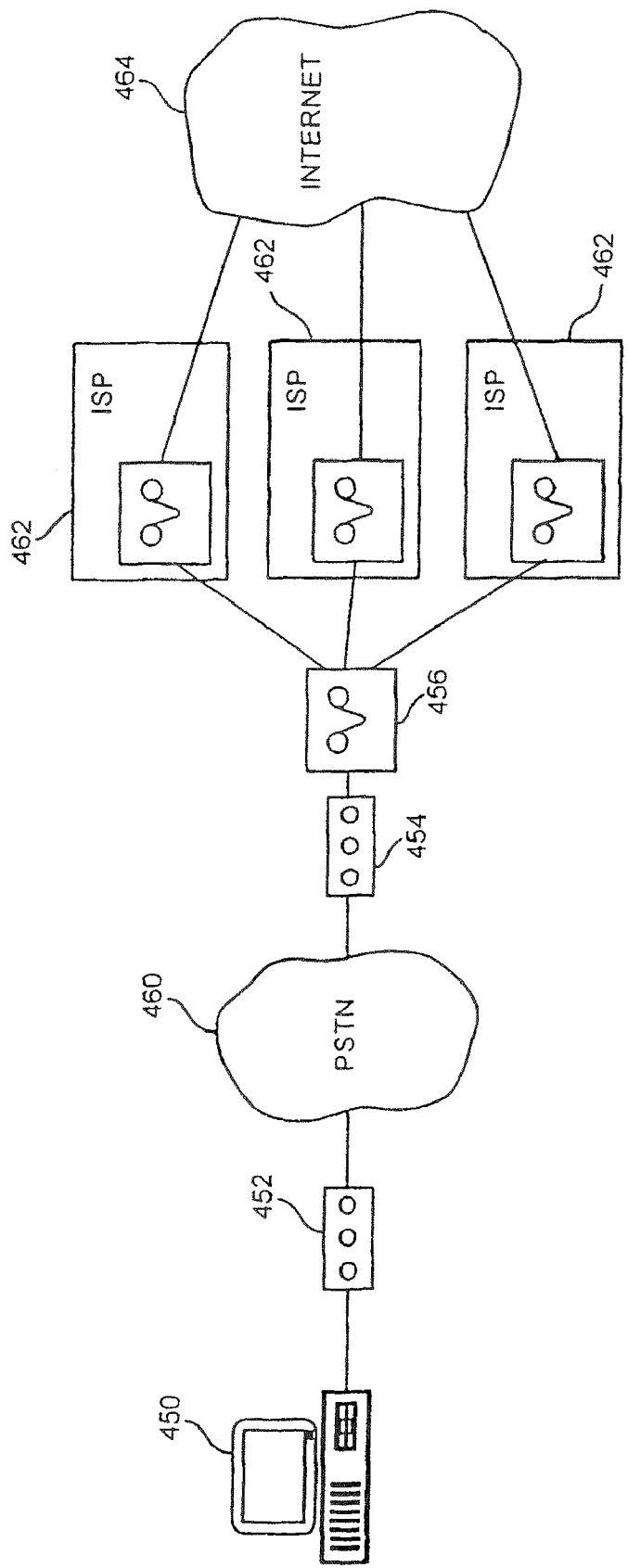
FIG. 9 is a schematic diagram of a second alternative embodiment of a virus screening system.

FIG. 9 is a schematic diagram of a second alternative embodiment of a virus screening system. A user computer 450 having a modem 452 communicates with a modem 454 associated with a gateway 456. The modems 452 and 454 communicate via a public switched telephone network 460 or another connection means.

The gateway 456 communicates with a plurality of internet service providers 462. The internet service providers 462 are in communication with the Internet 464. The gateway 456 provides a service bureau to download data from the Internet 464 via at least one of the internet service providers 462 as requested by the user computer 450. The service bureau screens the data for at least one virus, and communicates the data to the user computer 450 if no viruses are detected.

Figure 10:
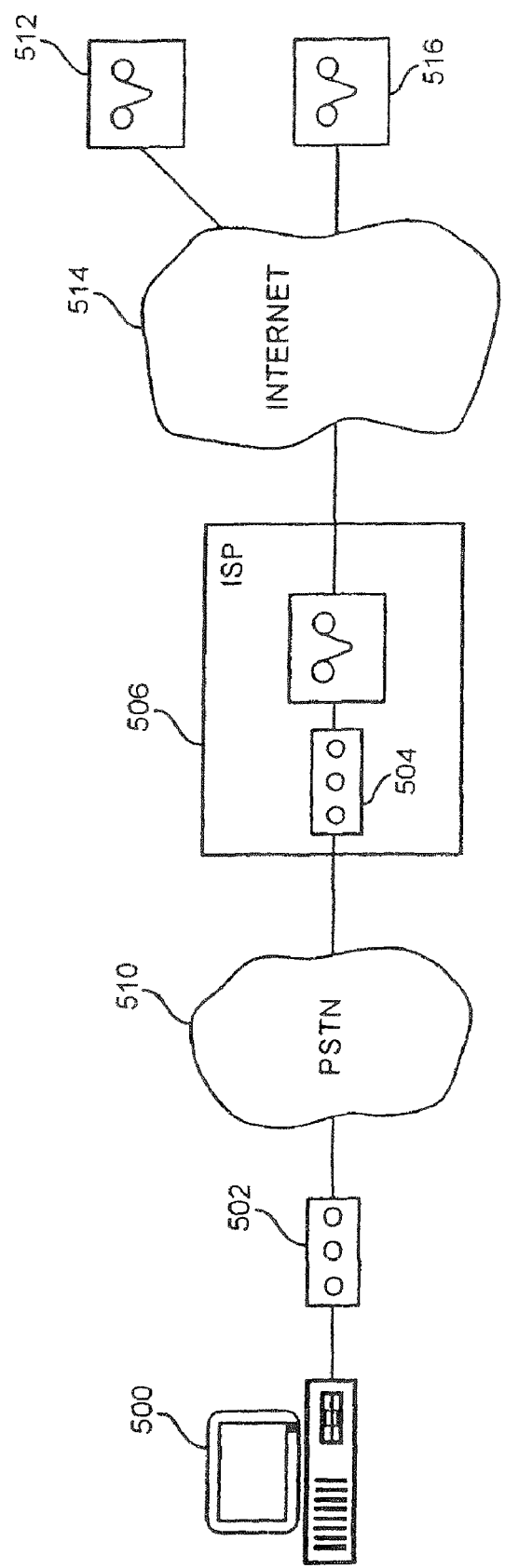
FIG. 10 is a schematic diagram of a third alternative embodiment of a virus screening system.

FIG. 10 is a schematic diagram of a third alternative embodiment of a virus screening system. A user computer 500 having a modem 502 communicates with a modem 504 associated with an internet service provider 506. The modems 502 and 504 communicate via a public switched telephone network 510 or another connection means.

The internet service provider 506 communicates with a service bureau 512 via the Internet 514. The service bureau 512 receives downloaded data from a date source 516 as requested by the user computer 500. The service bureau 512 screens the data for at least one virus, and communicates the data to the internet service provider 506 if no viruses are detected. The internet service provider 506, in turn, communicates the data to the user computer 500 if no viruses are detected.

Figure 11:
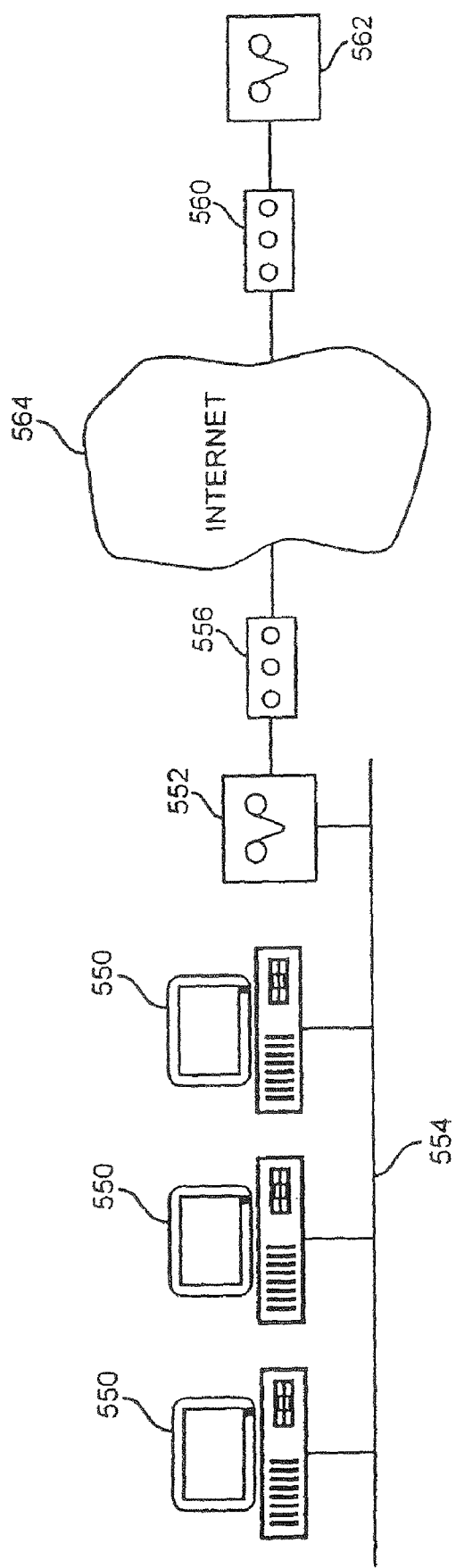
FIG. 11 is a schematic diagram of a fourth alternative embodiment of a virus screening system.
Figure 3:
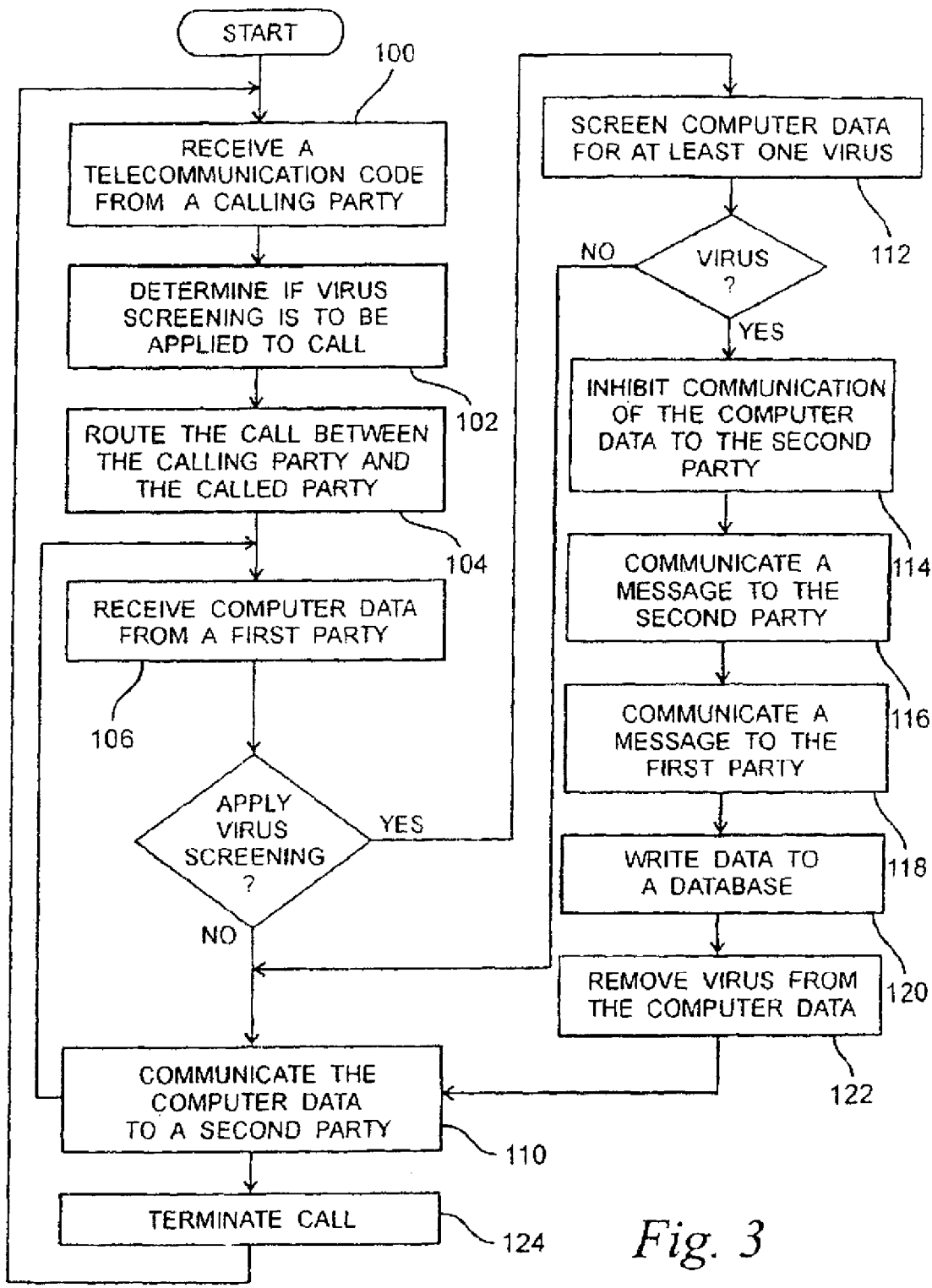

FIG. 11 is a schematic diagram of a fourth alternative embodiment of a virus screening system. A plurality of user computers 550 communicate with a service bureau 552 via a local area network 554. The service bureau 552 has an associated modem 556 to communicate with a modem 560 associated with a data source 562. The modems 556 and 560 communicate via a public switched telephone network 564 or another connection means. The plurality of user computers 550 share access to the service bureau 552 to screen data from the data source 562. The service bureau 552 routes screened data to one or more of the user computers 550 which made a request therefor.

It is noted that a network-based virus screening device (i.e. a service bureau) can actively communicate with software loaded into a user computer. If the network-based virus screening device maintains PPP/IP/TCP stacks, the network-based virus screening device can insert IP packets in the PPP stream to the user computer and can receive packets addressed thereto without passing the packets to the ISP. Using this approach, a private communication channel can be established with the user computer. If the computational complexity of this approach is excessive, the user computer can communicate a message to the network-based virus screening device to selectively activate the virus screening (such as when downloading a file which potentially has a virus).

It is noted that by establishing a private communication channel, a graphical window associated with the virus screening service can be open on a graphical desktop of the user computer. An information stream separate from data generated during an Internet session can be displayed within the graphical window. The graphical window can include graphical buttons which can be user-selected to interact with the virus screening service. The size of the graphical window, the number of graphical buttons, and a rate of updating the information can be selected by the virus screening service. The information can include headlines, interactive advertisements, emergency warning messages, and the like. Optionally, the information can be communicated only when the communication associated with the Internet session is idle.

Thus, there has been described herein a concept, as well as several embodiments including preferred embodiments of a computer virus screening methods and systems.

Because the various embodiments of the present invention screen computer data for viruses in a telephone network, they provide a significant improvement in that end users can download computer data via the telephone network without concern of receiving various predetermined computer viruses.

Additionally, the virus screening methods and systems can examine data unidirectionally (in either direction) or bidirectionally between two parties. A party calling a dial-up service such as an Internet Service Provider or a Bulletin Board Service may elect to only screen data that flows from the service to its computer. An ISP or a BBS may elect bidirectional screening for transmitted files and received files.

Further, embodiments of the present invention create models of end users' computers for use in virus screening. Using a model, an installation program detects and alters an emulated environment of the end user's computer without actually altering the end user's computer.

Still further, by installing downloaded data using the virus-screening processor, viruses can be detected in installed data (which may differ from the downloaded data). Scanning for viruses in the installed data is advantageous because an installation program may rearrange segments of the downloaded data to make a virus undetectable by scanning the downloaded data.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method comprising:
    receiving a status update from a client device, wherein the status update reflects at least one change associated with the client device;
    updating a model of the client device based on the status update;
    receiving data to be screened for a virus, wherein the data is received after an updating of the model of the client device; and
    screening the model of the client device for the virus.

2. The method of claim 1, further comprising:
    executing a program included in the data;
    intercepting a read request generated by the program; and
    generating a response to the read request using parameters of the model of the client device.

3. The method of claim 1, further comprising:
    executing a program included in the data;
    intercepting a write request generated by the program; and
    updating the model of the client device in response to the write request.

4. The method of claim 3, further comprising:
    communicating to the client device, in response to an acceptance of the data by the client device, modifications made to the model of the client device during execution of the program.

5. The method of claim 4, wherein the communicating further comprises communicating via the Internet, and wherein the modifications allow the client device to execute the program without performing a full installation of the program.

6. The method of claim 1, further comprising:
communicating a result of the screening to the client device.

7. The method of claim 1, wherein the screening further comprises screening the model of the client device for at least one of:
a trojan, or
a worm.

8. The method of claim 1, further comprising:
generating the model of the client device, wherein the model of the client device is implemented as a virtual channel in an interactive session.

9. An article of manufacture including a non-transitory computer-readable storage medium having instructions stored thereon, execution of which by a computing device causes the computing device to perform operations comprising:
receiving a status update from a client device, wherein the status update reflects at least one change associated with the client device;
receiving data to be screened for a virus, wherein the data is received after an updating of a model of the client device based on the status update; and
screening the model of the client device for a virus.

10. The article of manufacture of claim 9, wherein the operations further comprise:
executing a program included in the data;
intercepting a write request generated by the program; and
updating the model of the client device in response to the write request.

11. The article of manufacture of claim 10, wherein the operations further comprise: communicating, in response to an acceptance of the data by the client device, modifications made to the model of the client device during execution of the program, wherein the modifications enable the client device to execute the program without performing a full installation of the program.

12. The article of manufacture of claim 9, wherein the screening further comprises screening the model of the client device for at least one of:
a trojan, or
a worm.

13. The article of manufacture of claim 9, wherein the operations further comprise:
generating the model of the client device, wherein the model of the client device is implemented as a virtual channel in an interactive session.

14. A system comprising:
a processor; and
a memory storing instructions, execution of the instructions by a computing device causing the computing device to perform operations comprising:
receiving a status update from a client device, wherein the status update reflects at least one change associated with the client device;
receiving data to be screened for a virus, wherein the data is received after an updating of a model of the client device based on the status update; and
screening the model of the client device for a virus.

15. The system of claim 14, wherein the operations further comprise:
executing a program included in the data;
intercepting a write request generated by the program; and
updating the model of the client device in response to the write request.

16. The system of claim 15, wherein the operations further comprise: communicating, in response to an acceptance of the data by the client device, modifications made to the model of the client device during execution of the program, wherein the modifications enable the client device to execute the program without performing a full installation of the program.

17. The system of claim 14, wherein the screening further comprises screening the model of the client device for at least one of:
a trojan, or
a worm.

18. The system of claim 14, wherein the operations further comprise:
generating the model of the client device, wherein the model of the client device is implemented as a virtual channel in an interactive session.

* * * * *

UNITED STATES PATENT AND TRADEMARK OFFICE
CERTIFICATE OF CORRECTION

PATENT NO. : 8,407,796 B2
APPLICATION NO. : 12/845479
DATED : March 26, 2013
INVENTOR(S) : Franczek et al.

Page 1 of 2

It is certified that error appears in the above-identified patent and that said Letters Patent is hereby corrected as shown below:

On Title Page 3, Item (56), under "OTHER PUBLICATIONS", in Column 1, Line 3, delete "pages" and insert -- pages. --, therefor.

On Title Page 3, Item (56), under "OTHER PUBLICATIONS", in Column 1, Line 49, delete "Breif," and insert -- Brief, --, therefor.

On Title Page 3, Item (56), under "OTHER PUBLICATIONS", in Column 2, Lines 46-47, delete "Clarifiction" and insert -- Clarification --, therefor.

In the Drawings

In Fig. 3, Sheet 3 of 11, for Tag "112", in Line 2, delete "FOR LEAST" and insert -- FOR AT LEAST --, therefor. (See Attached Sheet)

In the Specification

In Column 4, Line 16, delete "FIG. 2" and insert -- FIG. 2. --, therefor.

In Column 5, Line 64, delete "for, example," and insert -- for example, --, therefor.

Signed and Sealed this
Seventeenth Day of September, 2013

Teresa Stanek Rea
*Deputy Director of the United States Patent and Trademark Office*